May 15, 1923.  1,455,106
W. F. BUTLER
TRAP
Filed Feb. 27, 1922
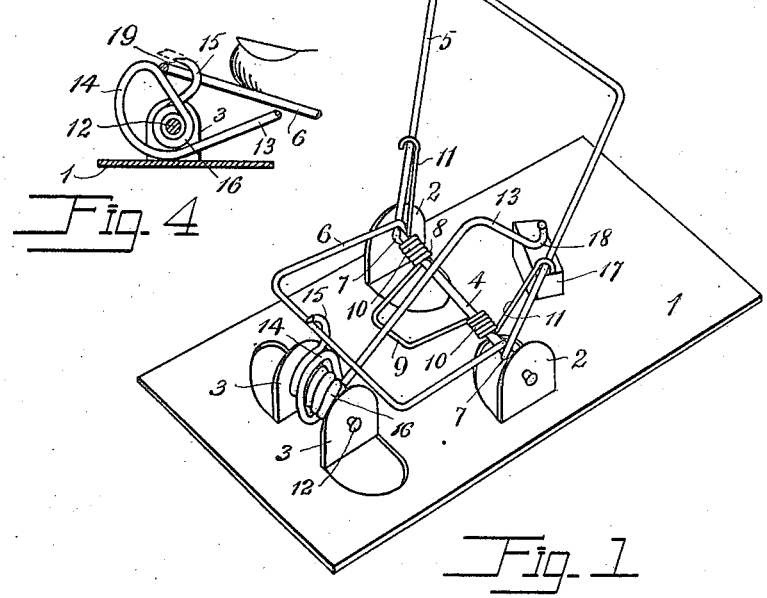
Fig. 4
Fig. 1
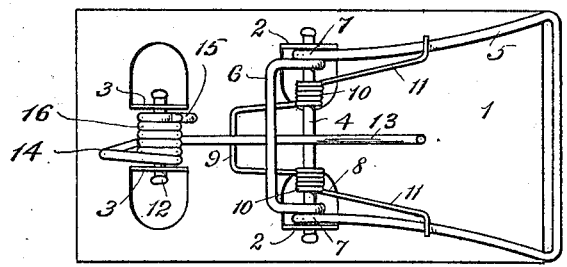
Fig. 2
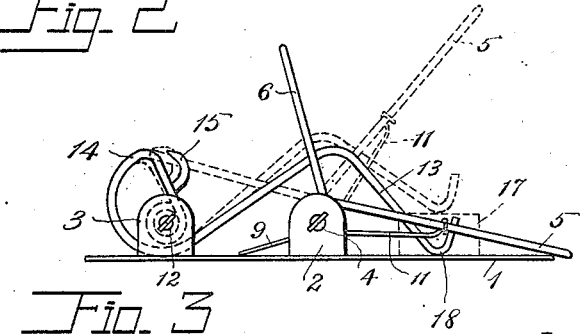
Fig. 3
INVENTOR
Wm. F. Butler
By H N Low Atty.

Patented May 15, 1923.

1,455,106

UNITED STATES PATENT OFFICE.

WILLIAM F. BUTLER, OF HILLSIDE, NEW JERSEY.

TRAP.

Application filed February 27, 1922. Serial No. 539,677.

*To all whom it may concern:*

Be it known that I, WILLIAM F. BUTLER, a citizen of the United States, residing at Hillside, in the county of Union and State of New Jersey, have invented certain new and useful Improvements in Traps, of which the following is a specification.

The invention relates to animal traps, and is especially useful in connection with mouse and rat traps, and has for its object to improve and economize in the general construction of the traps by a new construction and arrangement of certain of the working elements thereof resulting in a convenient and secure setting of the trap and also a certainty that the bait cannot be removed by the animal without springing the trap, the improvements relating more particularly to the setting and springing devices. It may be here stated that said improvements are applicable to traps either of the striker type or of the cage type, without change in the nature of the invention.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration.

In said drawings:—

Fig. 1 is a perspective view of a trap of the striker type, embodying the invention.

Fig. 2 is a plan view of the same.

Fig. 3 is a side view.

Fig. 4 is a detail view partly in section showing the action of the setting and trigger elements in the setting of the trap.

Referring to the drawings 1 indicates the base of the trap which is often of wood but is herein shown as of sufficiently stiff sheet metal having cut out and bent up therefrom bearing ears 2, 2 and 3, 3 for the support of the working parts. 4 is the main striker shaft journaled in the ears 2 and having mounted thereon, to turn therewith or relative thereto, the striker 5 which is or may be of usual U-shaped form. 6 is the setting element constructed and arranged to move and turn with the striker 5, which is conveniently accomplished by making it of the same continuous wire which is turned around the shaft 4 at the points 7. The striker is impelled by a spring 8 of the usual or sufficient strength which is formed with a bearing part 9 arranged to rest on the top of the base 1 and is thence extended to and coiled around the shaft 4 at the points 10, and thence extends in the form of hook arms 11 which engage the striker 5 at each side thereof so as to be capable of impelling the striker strongly downward to and against the base 1. 12 is the setting shaft mounted in the bearing ears 3 and supporting the bait arm 13, the bait arm lifter 14 and the trigger 15, the latter being arranged to hook over the setting element 6 sufficiently to maintain the striker in raised position, provided the bait arm be properly supported. The said parts 13, 14 and 15 are preferably made of a single piece of wire coiled and bent and extended as illustrated, or in an equivalent manner, the intermediate part thereof being formed as a coil 16 which embraces the shaft 12.

The bait arm 13 is supported in its position to hold the trap set (seen in Fig. 1) by means of a piece 17 of suitable bait, for instance a piece of cheese or other substance attractive to the animal. In order that the bait may be more readily withdrawn from under the bait arm the extremity of the latter is formed with a depending and rounded portion 18 which rests smoothly on the bait so as to allow the latter to be easily withdrawn to allow the dropping of the bait arm to the position which will permit the springing of the trap.

The extremity 19 (best shown in Fig. 4) of the trigger has a sufficient upward inclination or wedge shape so that the upward pressure of the setting arm 6 will throw off the trigger, as soon as the bait arm drops, thereby entirely setting free the arm 6 and striker 5 to be impelled by the spring arms 11 for the killing or catching of the animal at the instant when it removes the bait from under the bait arm.

In the setting of the trap the trap may be taken in one hand and the setting element 6 depressed by the thumb whereupon said arm will encounter the bait arm lifter 14 and press it in such direction as to lift the bait arm in a manner which will be readily understood. When the bait arm is thus lifted the bait is inserted with the other hand in proper place beneath the part 18, and then the pressure of the thumb is released. When the bait arm is arrested by the bait the trigger will remain in the position shown by dotted lines in Fig. 4 so that it will arrest the upward movement of the setting element 6 and hold the trap set so long as the bait is not removed. If the animal should not attempt to take away the bait but to consume it while in place, nevertheless the consumption of the bait will cause the dropping of the bait arm and the springing of the trap as already described.

I use the words "animal-catching element" to include a striker which kills or holds the animal, and also a door which springs shut to close a cage-trap, and other animal-catching means; my bait arm and trigger mechanism being adaptable to various forms of traps.

What I claim is—

1. In a setting mechanism for traps, the combination of a movable element adapted to be held by the bait in position to maintain the trap set, an animal-catching element, means whereby the setting of the latter moves the said movable element to receive the bait and to be arrested thereby, and means connected with said movable element for holding and releasing said animal-catching element.

2. In a setting mechanism for traps, the combination of a bait arm adapted to be held by the bait in position to maintain the trap set, an animal-catching element, means whereby the setting of the latter moves the said bait arm to receive the bait and to be arrested thereby, and a trigger connected with said bait arm for holding and releasing said animal-catching element.

3. In a setting mechanism for traps, the combination of a bait arm adapted to be held by the bait in position to maintain the trap set, an animal-catching element, and a trigger formed and turning with said bait arm for holding and releasing said animal-catching element.

4. In a setting mechanism for traps, the combination of a movable element adapted to be held by the bait in position to maintain the trap set, an animal-catching element, means whereby the setting of the latter moves the said movable element to receive the bait and to be arrested thereby, and means connected with said movable element and having an inclined surface for holding and releasing said animal-catching element.

5. In a setting mechanism for traps, the combination of a movable element adapted to be held by the bait in position to maintain the trap set, an animal-catching element, and a trigger connected with said movable element and having an inclined surface for holding and releasing said animal-catching element, said inclined surface moving substantially horizontally and the said movable element moving therewith substantially vertically.

6. In a setting mechanism for traps, the combination of a movable element adapted to be held by the bait in position to maintain the trap set, an animal-catching element, means whereby the setting of the latter moves the said movable element to receive the bait and to be arrested thereby, and a trigger connected with said movable element and having an inclined surface for holding and releasing said animal-catching element, said inclined surface moving substantially horizontally and the said movable element moving therewith substantially vertically.

7. In a setting mechanism for traps, the combination of a pivoted movable element adapted to be held by the bait in position to maintain the trap set, an animal-catching element, pivoted means whereby the setting of the latter moves the said movable element to receive the bait and to be arrested thereby, and pivoted means connected with said movable element for holding and releasing said animal-catching element, said movable element and means for moving the movable element and holding means being all united and turnable together around a common axis.

8. The combination of a bait arm arranged to be held in set position by the bait, an animal-catching element having a setting arm, a bait arm lifter on the bait arm which is actuated by the setting arm to lift the bait arm, and a trigger on said lifter for holding and releasing the setting arm.

In testimony whereof I affix my signature.

WILLIAM F. BUTLER.